US008103638B2

(12) United States Patent
Voznika et al.

(10) Patent No.: US 8,103,638 B2
(45) Date of Patent: Jan. 24, 2012

(54) PARTITIONING OF CONTENDED SYNCHRONIZATION OBJECTS

(75) Inventors: Fabricio Voznika, Kenmore, WA (US); Alexandre Verbitski, Woodinville, WA (US); Pravin Mittal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 380 days.

(21) Appl. No.: 12/436,805

(22) Filed: May 7, 2009

(65) Prior Publication Data

US 2010/0287203 A1 Nov. 11, 2010

(51) Int. Cl.
*G06F 7/00* (2006.01)
*G06F 17/00* (2006.01)

(52) U.S. Cl. ......... 707/687; 707/704; 710/200; 711/145

(58) Field of Classification Search .................. 707/687, 707/704, 999.8; 710/200; 711/145
See application file for complete search history.

(56) References Cited

U.S. PATENT DOCUMENTS

| | | | |
|---|---|---|---|
| 5,835,755 A | 11/1998 | Stellwagen, Jr. | |
| 6,092,156 A * | 7/2000 | Schibinger et al. | ........... 711/145 |
| 6,370,619 B1 | 4/2002 | Ho et al. | |
| 6,470,360 B1 | 10/2002 | Vaitheeswaran | |
| 6,484,161 B1 | 11/2002 | Chipalkatti et al. | |
| 6,490,585 B1 | 12/2002 | Hanson et al. | |
| 6,985,904 B1 | 1/2006 | Kaluskar et al. | |
| 7,051,188 B1 | 5/2006 | Kubala et al. | |
| 7,065,763 B1 * | 6/2006 | Martin et al. | ................. 718/102 |
| 7,073,002 B2 | 7/2006 | Armstrong et al. | |
| 7,739,245 B1 * | 6/2010 | Agarwal et al. | ............... 707/687 |
| 7,882,216 B2 * | 2/2011 | Houlihan et al. | ............. 709/224 |
| 2002/0199113 A1 * | 12/2002 | Pfister et al. | ................... 713/200 |
| 2004/0024797 A1 * | 2/2004 | Berry et al. | ................... 707/206 |
| 2004/0122845 A1 | 6/2004 | Lohman et al. | |
| 2005/0086195 A1 | 4/2005 | Tan et al. | |
| 2006/0036655 A1 * | 2/2006 | Lastovica, Jr. | ................ 707/203 |
| 2007/0299810 A1 | 12/2007 | Riedel et al. | |
| 2008/0059673 A1 * | 3/2008 | Mehaffy et al. | ............... 710/200 |
| 2008/0172429 A1 | 7/2008 | Lin et al. | |
| 2008/0256074 A1 * | 10/2008 | Lev et al. | .......................... 707/8 |
| 2008/0263001 A1 | 10/2008 | Lohman et al. | |
| 2009/0037498 A1 | 2/2009 | Mukherjee et al. | |

OTHER PUBLICATIONS

Odaira et al. "Selective Optimization of Locks by Runtime Statistics and Just-in-time Compilation", IEEE, 2003. Download: http://ieeexplore.ieee.org/stamp/stamp.jsp?tp=&arnumber=1213259.*
Guy Harrison, "Resolving Oracle Latch Contention", Quest Software, Jun. 2003. http://www.quest.com/documents/landing.aspx?id=241.*
"Performance Tuning Roadmap," retrieved at <<http://download-llnw.oracle.com/docs/cd/E11035_01/wls100/perform/basics.html>>, 4 Pages.
"System Performance Optimization and Workload Analysis," retrieved at <<http://www.perftuning.com/pages/c_tuning_opt.php>>, 2 Pages.

(Continued)

*Primary Examiner* — Hares Jami
(74) *Attorney, Agent, or Firm* — Toler Law Group, PC

(57) ABSTRACT

Methods, systems, and computer-readable media are disclosed for partitioning contended synchronization objects. A particular method determines a contention-free value of a performance metric associated with a synchronization object of a data structure. A contended value of the performance metric is measured, and the synchronization object is partitioned when the contended value of the performance metric exceeds a multiple of the contention-free value of the performance metric.

13 Claims, 8 Drawing Sheets

OTHER PUBLICATIONS

Kejser, Thomas et al, "Top 10 SQL Server Integration Services Best Practices," Published Oct. 1, 2008, retrieved at <<http://sqlcat.com/top10lists/archive/2008/10/01/top-10-sql-server-integration-services-best-practices.aspx>>, 11 Pages.

Oracle Corporation, "The Role of Cache Fusion in Resolving Cache Coherency Conflicts," retrieved at <<http://www.csee.umbc.edu/help/oracle8/server.815/a67778/chxx_cfu.htm>>, Chapter 20, 24 pages.

Meier, J.D. et al, "Improving SQL Server Performance," retrieved at <<http://msdn.microsoft.com/en-us/library/ms998577.aspx#scalenetchapt14%20_topic2>>, Chapter 14, 33 Pages.

Quest Software, "Resolving Latch Contention," retrieved at <<http://www.toadworld.com/Experts/GuyHarrisonsImprovingOraclePerformance/ResolvingOracleContention/Mar2008ResolvingLatchContention/tabid/320/Default.aspx>>, 7 Pages.

Guz, Zvika et al, "Utilizing Shared Data in Chip Multiprocessors with the Nahalal Architecture," SPAA '08, Jun. 14-16, 2008, Munich, Germany, 10 Pages.

Chang, Jichuan et al, "Cooperative Cache Partitioning for Chip Multiprocessors," ICS '07, Jun. 18-19, 2007, Seattle, WA, USA, 11 Pages.

* cited by examiner

PARTITIONING OF CONTENDED SYNCHRONIZATION OBJECTS

BACKGROUND

Data storage and retrieval systems, such as databases, often allow multiple access connections. For example, databases often allow more than one processor to access the same portion of the database. To maintain data integrity, synchronization objects such as latches may be used when a database allows multiple access connections. In a typical implementation, a latch associated with a particular data structure of a database is acquired by a processor before the processor can write to the particular data structure. When the particular data structure is frequently accessed, the latch may become "contended" or "hot" and the process of acquiring the latch may become a bottleneck that reduces the overall performance of the database. Latch acquisition operations may involve modifications of specific memory locations of a computing system. Therefore, latch acquisition may not scale in typical cache-coherent microprocessor designs when multiple processors attempt to modify or read the same memory location at the same time. For example, when 8 processors attempt to acquire the same latch, the acquisition operation may not simply be 8 times slower, but instead may be hundreds of times slower.

One way to resolve latch contention is by partitioning the contended latch. When a latch is partitioned, a separate copy of the latch may be created for each processor. Some systems partition a latch based on a static threshold such as the number of times the latch is acquired during a particular time period (e.g., the number of latch acquisitions per minute). However, when a large number of processors are forced to wait for a particular latch, the static threshold may not be reached even though the particular latch is in a state of contention.

SUMMARY

The present disclosure describes partitioning of contended synchronization objects, such as database latches, based on a comparison of a contention-free value of a performance metric and a contended value of the performance metric. During an initialization time of a database or other data structure when there is no contention for synchronization objects, a contention-free value of a performance metric associated with a synchronization object is measured. For example, the number of processor cycles to acquire a database latch may be measured during a startup time of the database. During operation of the database, contended values of the performance metric are measured. For example, when the latch is used during operation of the database, the number of processor cycles to acquire the latch may once again be measured. Based on a comparison of the contended value and the contention-free value, the synchronization object may be partitioned. For example, if it takes five hundred processor cycles to acquire the latch when the latch is contended and one hundred processor cycles to acquire the latch when the latch is contention-free, the latch may be partitioned if a database administrator has specified that latches should be partitioned when the contended value is greater than four times the contention-free value. The particular multiple (i.e., four in the previous example) that is used may be determined during database startup or adjusted during database operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a method is disclosed that includes determining a contention-free value of a performance metric associated with a synchronization object of a data structure. The method includes measuring a contended value of the performance metric. The method further includes partitioning the synchronization object when the contended value of the performance metric exceeds a multiple of the contention-free value of the performance metric.

In another particular embodiment, a system is disclosed that includes one or more data storage devices configured to store data of a database. The system also includes a paged buffer pool comprising a plurality of pages. The paged buffer pool is configured to retrieve data from the database by retrieving data from the one or more data storage devices. The paged buffer pool is configured to store data to the database by storing data to the one or more storage devices. The system further includes a plurality of processing units. Each of the plurality of processing units is configured to access a particular page of the paged buffer pool by acquiring a latch associated with the particular page. The system includes a latch monitor and a partition manager. The latch monitor is configured to determine a contention-free value of a performance metric for the latch during a startup time of the database. The partition manager is configured to partition the latch by generating a copy of the latch for each of the plurality of processing units. The latch monitor is also configured to measure a contended value of the performance metric during operation of the database. The latch monitor is further configured to direct the partition manager to partition the latch based on a comparison of the contended value of the performance metric to the contention-free value of the performance metric.

In another particular embodiment, a computer-readable medium is disclosed that includes instructions, that when executed by a computer, cause the computer to determine a contention-free number of processor cycles to acquire a latch associated with a database during a startup time of the database. The computer-readable medium also includes instructions, that when executed by the computer, cause the computer to measure a contended number of processor cycles to acquire the latch during operation of the database. The computer-readable medium also includes instructions, that when executed by the computer, cause the computer to partition the latch based on a comparison of the contended number of processor cycles to acquire the latch to the contention-free number of the processor cycles to acquire the latch.

Figure 1:
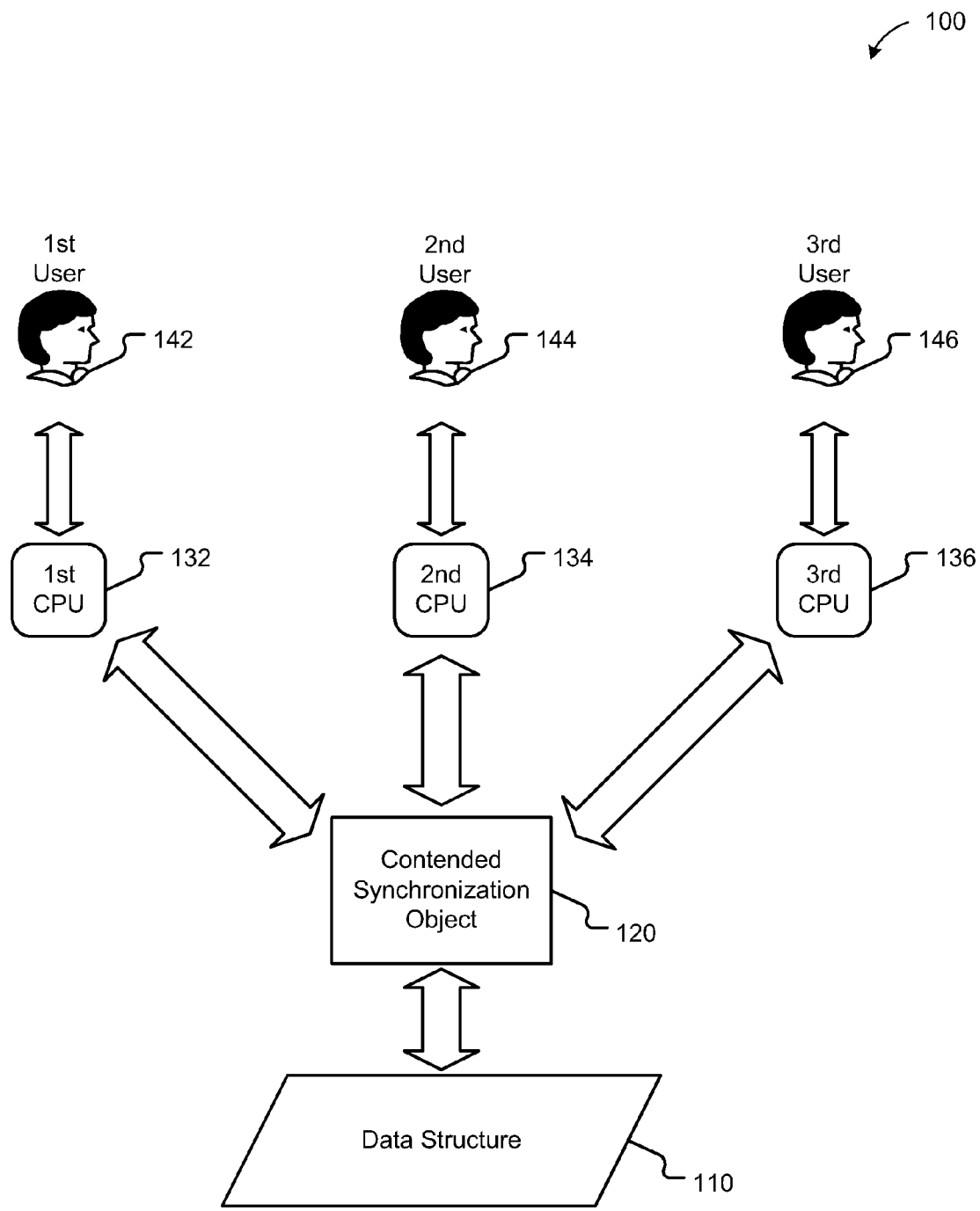
FIG. 1 is block diagram to illustrate contention of a synchronization object.

FIG. 1 is block diagram 100 to illustrate contention of a synchronization object. In the particular illustration of FIG. 1, a data structure 110 is accessible via a contended synchronization object 120. Each of a plurality of users operates a central processing unit (CPU). For example a first user 142 operates a first CPU 132, a second user 144 operates a second CPU 134, and a third user 146 operates a third CPU 136. Each of the CPUs 132, 134, and 136 interacts with the contended synchronization object 120. The contended synchronization object 120 may help reduce data access inconsistencies by preventing more than one CPU from writing to the data structure 110 at any given time and by preventing a CPU from reading from the data structure 110 while another CPU is writing to the data structure 110.

The data structure 110 may be a page of a database, a portion of a data cache, or some other data structure. When the data structure 110 is a page of a database, the contended synchronization object 120 may be a latch associated with the page of the database. In a particular embodiment, the contended synchronization object 120 is acquired each time a CPU performs a data access operation on the data structure 110 and is released when the CPU has completed the data access operation on the data structure 110. For example, the first CPU 132 may acquire the contended synchronization object 120 prior to initiating a data access operation on the data structure 110 and may release the contended synchronization object 120 after completing the data access operation on the data structure 110. Data access operations include, but are not limited to, reading data from the data structure 110 and writing data to the data structure 110.

The contended synchronization object 120 is said to be "contended" because competition exists for the contended synchronization object 120. For example, if both the first CPU 132 and the second CPU 134 elect to write to the data structure 110, then the first CPU 132 and the second CPU 134 contend (i.e., compete) to acquire the contended synchronization object 120. The CPU that successfully acquires the contended synchronization object 120 is able to write to the data structure 110 before the other CPU. The CPU that does not acquire the contended synchronization object 120 is forced to wait (e.g., spin or sleep) until the contended synchronization object 120 is released by the CPU that successfully acquired the contended synchronization object 120. For example, if the first CPU 132 acquires the contended synchronization object 120 first, then the first CPU 132 may write to the data structure 110 while the second CPU 134 waits until the first CPU 132 completes the write operation and releases the contended synchronization object 120. After the first CPU 132 releases the contended synchronization object 120, the second CPU 134 can acquire the contended synchronization object 120. In a particular embodiment, CPUs acquire the contended synchronization object 120 in the order that CPUs attempt to acquire the contended synchronization object 120. That is, a first-come first-serve policy may be implemented with respect to the contended synchronization object 120.

It will be noted that as the number of CPUs increases, the contended synchronization object 120 may become a bottleneck for data access operations associated with the data structure 110. It will thus be appreciated that reducing the contention of synchronization objects (e.g., the contended synchronization object 120) may result in improved data access performance. It should be noted that although the particular embodiment illustrated in FIG. 1 depicts multiple users with one CPU each, the contended synchronization object may also become contended due to a single user operating a multi-CPU computing device.

Figure 2:
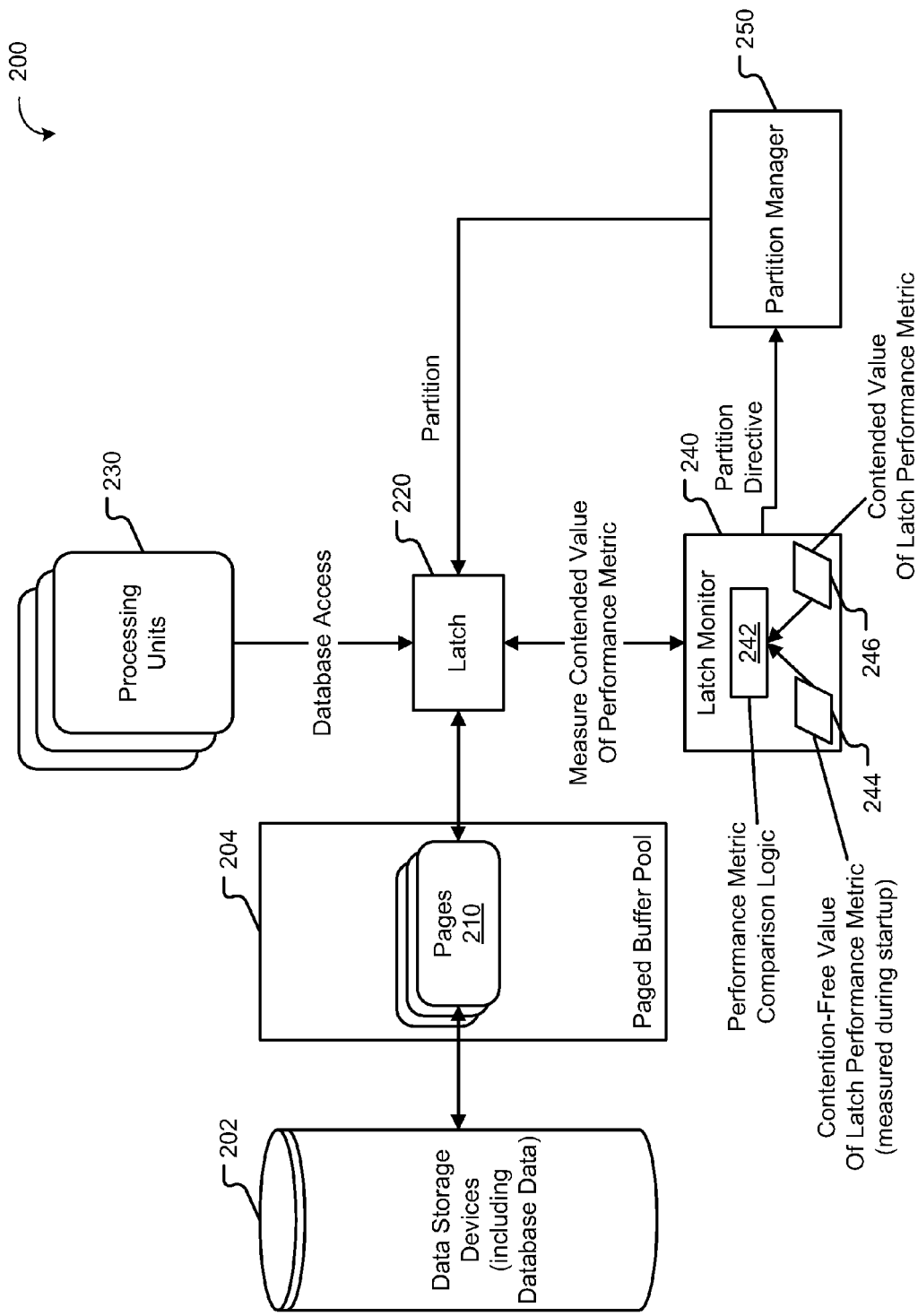
FIG. 2 is a block diagram to illustrate a particular embodiment of a system of partitioning a contended database latch.

FIG. 2 is a block diagram to illustrate a particular embodiment of a system 200 of partitioning a contended database latch 220. The system 200 includes one or more data storage devices 202 communicatively coupled to a paged buffer pool 204 that includes a plurality of pages 210. The paged buffer pool 204, a plurality of processing units 230, a latch monitor 240, and a partition manager 250 are all communicatively coupled to the latch 220. The latch monitor 240 and the partition manager 250 are also communicatively coupled to each other. In an illustrative embodiment, the processing units 230 include the CPUs 132, 134, and 136 of FIG. 1, the latch 220 is an example of the contended synchronization object 120 of FIG. 1, and one of the plurality of pages 210 embodies the data structure 110 of FIG. 1.

The one or more data storage devices 202 may be configured to store data of a database. The one or more data storage devices 202 may include hard disks, compact disks (CDs), digital versatile disks (DVDs), network storage devices, or any other data storage devices. In a particular embodiment, the data of the database is stored in pages, and commonly accessed pages are copied to the paged buffer pool 204.

The paged buffer pool 204 may be configured to retrieve data from a database by retrieving data from the one or more data storage devices 202. The paged buffer pool 204 may also be configured to store data to the database by storing data to the one or more data storage devices 202. In a particular embodiment, the paged buffer pool 204 stores pages of data retrieved from the database as the pages 210. In another particular embodiment, reading from and writing to the pages 210 is faster than reading from and writing to the data storage devices 202. As such, storing commonly accessed pages of the database in the paged buffer pool 204 and periodically committing changes to the data storage devices 202 may provide for efficient data access.

The latch 220 may be associated with a particular page of the pages 210 in the paged buffer pool 204. In a particular embodiment, the latch 220 is acquired each time one of the processing units 230 performs an access operation on the particular page associated with the latch 220. During operation, the latch 220 may become contended due to competition (i.e., contention) for the latch 220 between the various processing units 230. For example, any of the processing units that attempts to acquire the latch 220 while it is being held by one of the other processing units 230 will wait until the latch 220 is acquired. Because the waiting processing units 230 may not be able to perform any work until they successfully acquire the latch 220, the latch acquisition process may effectively become a bottleneck to database operations.

To reduce contention of the latch 220, the system 200 includes the latch monitor 240 and the partition manager 250. The latch monitor 240 may be configured to measure a contention-free value 244 of a performance metric associated with the latch 220 during a startup time of the database. For example, when the processing units 230 include CPUs, the latch monitor 240 may measure a contention-free number of CPU cycles it takes for a CPU to acquire the latch 220. The contention-free value 244 is "contention-free" because there is no contention for the latch 220 during database startup. In a particular embodiment, the latch monitor 240 measures and stores a contention-free value 244 of the performance metric for each of the processing units 230.

As described previously, the latch 220 may become contended while the database is in operation. During operation of the database, the latch monitor 240 may measure a contended value 246 of the performance metric associated with the latch 220. For example, when the processing units 230 include CPUs, the latch monitor 240 may measure a contended number of CPU cycles it takes each of the CPUs to acquire the latch 220. In a particular embodiment, the contended value 246 of the performance metric is measured periodically. Alternatively, the contended value 246 of the performance metric may be measured every N instances of an operation (e.g., an acquire operation) associated with the latch 220, where N is an integer greater than or equal to one. For example, the contended value 246 of the performance metric may be measured every 20th acquisition of the latch 220 (i.e., N=20). The latch monitor 240 may also be configured to track other metrics associated with the latch 220, such as how many times the latch 220 has been acquired or released.

The latch monitor 240 may include performance metric comparison logic 242 configured to compare the contention-free value 244 of the performance metric with the contended value 246 of the performance metric. In a particular embodiment, the latch monitor 240 issues a partition directive to the partition manager 250 when the performance metric comparison logic 242 determines that the contended value 246 of the performance metric exceeds a particular multiple of the contention-free value 244 of the performance metric. For example, the latch monitor 240 may issue a partition directive to the partition manager 250 when the contended number of CPU cycles to acquire the latch 220 exceeds a particular multiple (e.g., four) of the contention-free number of CPU cycles to acquire the latch 220. In a particular embodiment, the particular multiple is determined during database startup. Alternatively, the particular multiple may be dynamically adjusted during operation of the database. The particular multiple may be an integer or a floating-point number. In a particular embodiment, the latch monitor 240 issues a partition directive based on some other function of the contended number of processor cycles and the contention-free number of processor cycles.

In a particular embodiment, the latch monitor 240 may calculate a threshold equal to a particular multiple of the contention-free value 244, the performance metric comparison logic 242 may compare the contended value 246 of the performance metric to the threshold, and the latch monitor 240 may issue a partition directive to the partition manager 250 when the contended value 246 exceeds the threshold.

The partition manager 250 is configured to receive partition directives from the latch monitor 240 and to partition latches (e.g., the latch 220) in response to receiving partition directives from the latch monitor 240. For example, when the partition manager 250 receives a directive from the latch monitor 240 to partition the latch 220, the partition manager 250 may partition the latch 220.

Partitioning of a synchronization object (e.g., a latch) may include generating a copy of the synchronization object for each contending client of the synchronization object. The synchronization object may be partitioned when the memory cost of creating and maintaining multiple copies of the synchronization object is outweighed by the time cost (due to contention) associated with leaving the synchronization object unpartitioned. In the particular embodiment illustrated in FIG. 2, when the partition manager 250 partitions the latch 220, the partition manager 250 may generate a separate copy of the latch 220 for each of the plurality of processing units 230. It will thus be appreciated that partitioning the latch 220 may reduce contention for the latch 220 amongst the plurality of processing units 230, because a copy of the latch 220 is available for each of the plurality of processing units 230 after the latch 220 has been partitioned. In a particular embodiment, partitioning the latch 220 may favor a specific pattern of data access (e.g., favor read operations over write operations). For example, the system 200 of FIG. 2 may make write operations more expensive (e.g., time-consuming) when the latch 220 is partitioned, since a write operation would need to update every copy of the partitioned latch 220, a read operation would only need to read a particular copy of the partitioned latch 220.

In operation, the latch monitor 240 may measure the contention-free value 244 of the performance metric associated with the latch 220 during a startup time of the database, where the latch 220 is associated with one of the pages 210. For example, the latch monitor 240 may determine that it takes one of the processing units 230 one hundred CPU cycles to acquire the latch 220 during the startup time of the database (i.e., when the latch 220 is contention-free).

During operation of the database, the latch 220 may become contended due to simultaneous acquisition attempts by the processing units 230. The latch monitor 240 may measure the contended value 246 of the performance metric associated with the latch 220 during operation of the database. For example, the latch monitor 240 may determine that it takes one of the processing units 230 five hundred CPU cycles to acquire the latch 220. The performance metric comparison logic 242 may then compare the contended value 246 to the contention-free value 244. Based on the comparison, the latch monitor 240 may issue a partition directive to the partition manager 250. For example, the latch monitor 240 may issue a partition directive to the partition manager 250 when the contended value 246 exceeds a particular multiple of the contention-free value 244. The partition manager 250 may then reduce contention for the latch 220 by partitioning the latch 220 including generating a copy of the latch 220 for each of the processing units 230.

In one test, when a structured query language (SQL) database system scaled from 64 CPUs to 128 CPUs (e.g., the processing units 230), overall performance decreased by 80% due to latch contention instead of increasing due to the increased processing ability. That is, 128 CPU performance was only 20% of 64 CPU performance, due to many of the 128 CPUs spinning or sleeping while waiting for a latch to be released. Current partitioning systems typically rely on static thresholds such as a number of completed acquire operations per minute to determine when to partition a latch. However, due to a large number of CPUs sleeping or spinning, the static threshold may not be reached even though there is a high level of contention. By contrast, after the system 200 of FIG. 2 was introduced to reduce latch contention, the 128 CPU performance improved to 170% of 64 CPU performance. It will thus be appreciated that the system 200 of FIG. 2 may improve database performance by reducing contention associated with database latches. By enabling a database system to scale to a higher number of processors, the system 200 of FIG. 2 may enable the database system to operate more efficiently and support a larger number of simultaneous data access connections.

It should be noted that although the particular embodiment illustrated in FIG. 2 depicts partitioning a database latch (e.g., the latch 220), synchronization objects that are associated with other data structures may also be partitioned. For example, synchronization objects associated with shared data caches (e.g., shared level one (L1) caches in a multiprocessor computer) may similarly be partitioned, including measuring a contention-free value of a cache metric during a startup time of the cache and measuring a contended value of the cache metric while the cache is in use.

Figure 3:
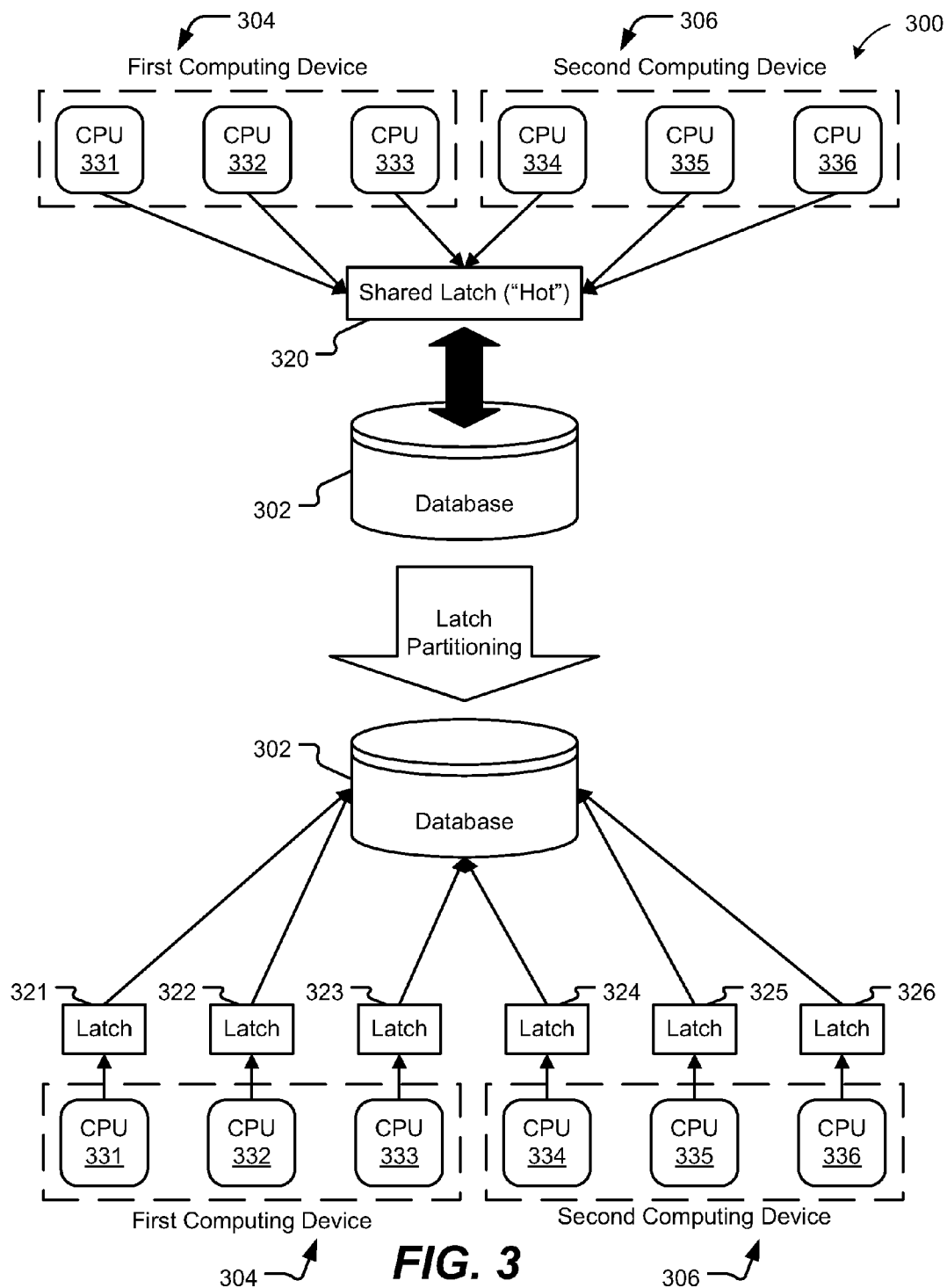
FIG. 3 is a block diagram to provide illustrations of a database system before and after latch partitioning as described with reference to FIG. 2.

FIG. 3 is a block diagram 300 to provide illustrations of a database system before and after latch partitioning as described with reference to FIG. 2. Prior to latch partitioning, a database 302 is accessible to a plurality of CPUs in a plurality of computing devices via a shared latch. For example, in the particular embodiment illustrated in FIG. 3, the database 302 is accessible to CPUs 331, 332, and 333 of a first computing device 304 and CPUs 334, 335, and 336 of a second computing device 306 via a shared latch 320. In an illustrative embodiment, the database 302 is stored in the data storage devices 202 of FIG. 2, and the CPUs 331-336 are the processing units 230 of FIG. 2.

The shared latch 320 may be concurrently acquired for a read operation at the database 302 by more than one of the CPUs 331-336, but may only be acquired by one of the CPUs 331-336 for a write operation at the database 302. The shared latch 320 is said to be "hot" because it is contended. The shared latch 320 may become "hot" as described herein with reference to the contended synchronization object 120 of FIG. 1 and the latch 220 of FIG. 2. When the shared latch 320 becomes "hot," the shared latch 320 may be partitioned as described with reference to the latch 220 of FIG. 2.

In a particular embodiment, partitioning is device specific. For example, a contention-free value of a performance metric associated with the shared latch 320 may be determined for each of the computing devices 304 and 306. Contended values of the performance metric associated with the latch 320 may be measured at each of the computing devices 304 and 306. The shared latch 320 may be partitioned at a particular one of the computing devices when the contended value measured at the particular computing device exceeds a particular multiple of the contention-free value measured at the particular computing device. For example, the shared latch 320 may be partitioned for the first computing device 304 but not the second computing device 306 when the shared latch 320 has a high level of contention with respect to the first computing device 304 but a low state of contention (or contention-free) with respect to the second computing device 306.

In the particular embodiment illustrated in FIG. 3, the shared latch 320 is partitioned for both computing devices 304 and 306. Following partitioning of the shared latch 320, a copy of the shared latch 320 may exist for each of the CPUs 331-336. Therefore, in the first computing device 304, the CPU 331 may access the database 302 via a latch 321, the CPU 332 may access the database 302 via a latch 322, and the CPU 333 may access the database 302 via a latch 323. Similarly, in the second computing device 306, the CPU 334 may access the database 302 via a latch 324, the CPU 335 may access the database 302 via a latch 325, and the CPU 336 may access the database 302 via a latch 326. It will thus be appreciated that the partitioned latches 321-326 may improve the throughput of database accesses of the database 302.

Figure 4:
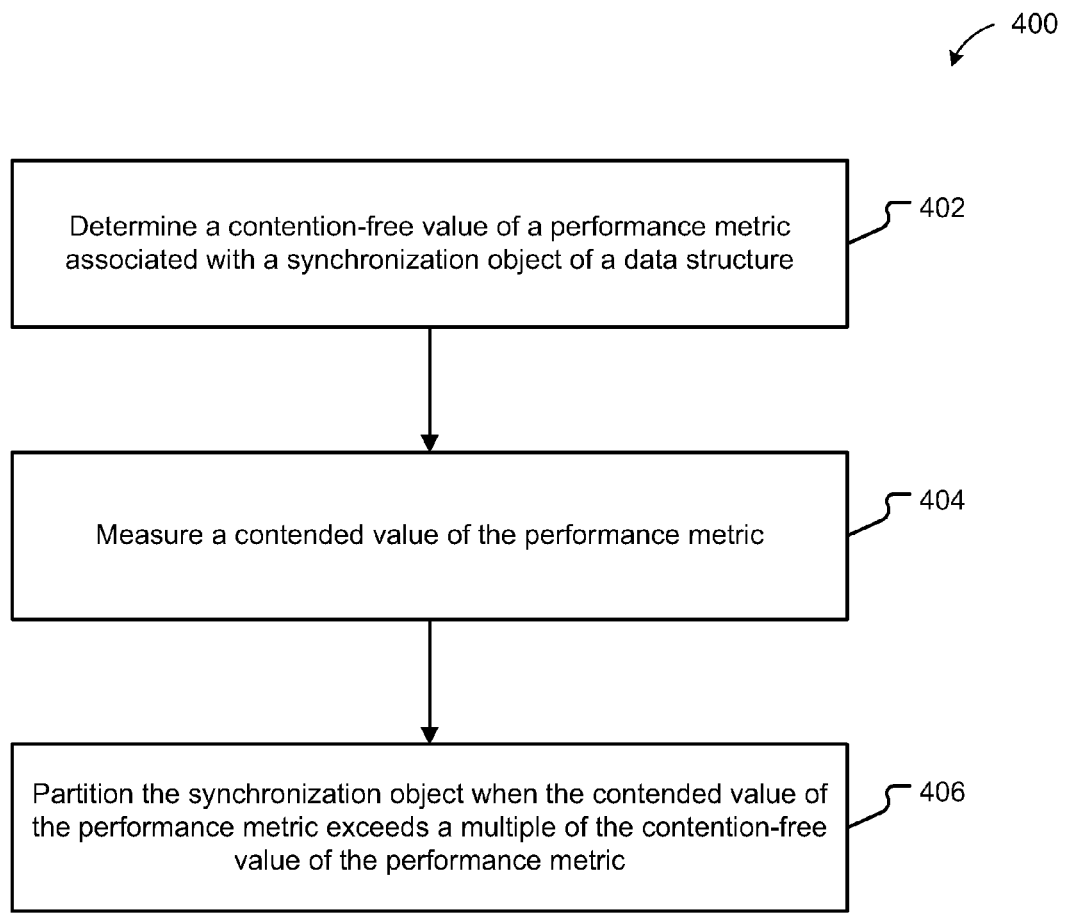
FIG. 4 is a flow diagram to illustrate a particular embodiment of a method of partitioning a contended synchronization object.

FIG. 4 is a flow diagram to illustrate a particular embodiment of a method of partitioning a contended synchronization object. In an illustrative embodiment, the method 400 may be performed by the system 200 of FIG. 2.

The method 400 includes determining a contention-free value of a performance metric associated with a synchronization object of a data structure, at 402. For example, in FIG. 2, the latch monitor 240 may measure the contention-free value 244 of the performance metric associated with the latch 220 for one of the pages 210 of the paged buffer pool 204.

The method 400 also includes measuring a contended value of the performance metric, at 404. For example, in FIG. 2, the latch monitor 240 may measure the contended value 246 of the performance metric associated with the latch 220.

The method 400 further includes partitioning the synchronization object when the contended value of the performance metric exceeds a multiple of the contention-free value of the performance metric, at 406. For example, in FIG. 2, the partition manager 250 may partition the latch 220 when the contended value 246 of the performance metric exceeds a multiple of the contention-free value 244 of the performance metric.

It will be appreciated that the method 400 of FIG. 4 may be used to reduce contention associated with synchronization objects (e.g., the latch 220 of FIG. 2), thereby improving throughput of data access (e.g., read and write) operations.

Figure 5:
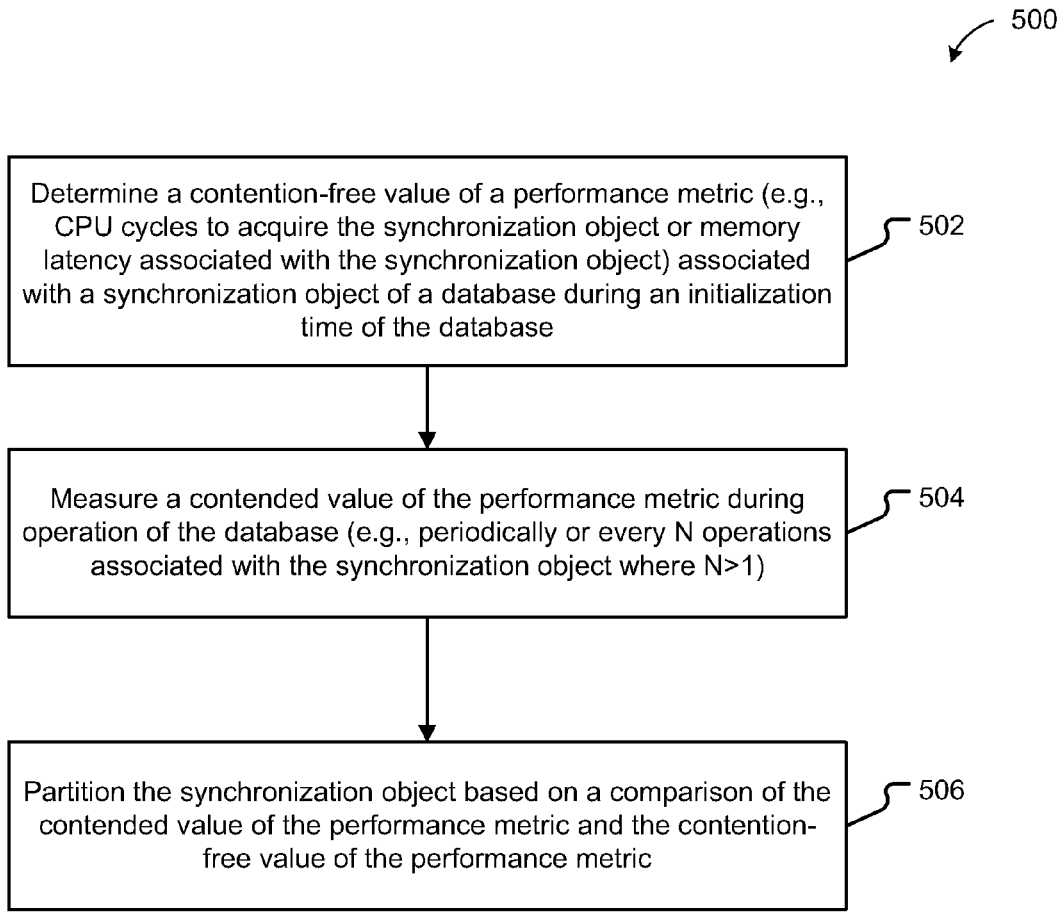
FIG. 5 is a flow diagram to illustrate another particular embodiment of a method of partitioning a contended synchronization object.

FIG. 5 is a flow diagram to illustrate another particular embodiment of a method 500 of partitioning a contended synchronization object. In an illustrative embodiment, the method 500 may be performed by the system 200 of FIG. 2.

The method 500 includes determining a contention-free value of a performance metric associated with a synchronization object of a database during an initialization time of the database, at 502. The performance metric may be a number of CPU cycles to acquire the synchronization object or memory latency associated with the synchronization object. For example, in FIG. 2, the latch monitor 240 may measure the contention-free value 244 of the performance metric during an initialization time of a database stored in the one or more data storage devices 202.

The method 500 also includes measuring a contended value of the performance metric during operation of the database, at 504. The contended value may be measured periodically or may be measured every N operations associated with the synchronization object, where N is greater than one. For example, in FIG. 2, the latch monitor 240 may measure the contended value 246 of the performance metric associated with the latch 220 periodically or every Nth (e.g., 20th) time the latch 220 is acquired.

The method 500 further includes partitioning the synchronization object based on a comparison of the contended value of the performance metric and the contention-free value of the performance metric, at 506. For example, in FIG. 2, the partition manager 250 may partition the latch 220 based on a comparison of the contended value 246 of the performance metric and the contention-free value 244 of the performance metric.

It will be appreciated that the method 500 of FIG. 5 may enable the partitioning of synchronization objects (e.g., the latch 220 of FIG. 2) based on different kinds of performance metrics (e.g., CPU cycles or memory latency). It will also be appreciated that the method 500 of FIG. 5 may support both time-based measurement (e.g., periodic) of the contended value of the performance metric as well as volume-based measurement (e.g., every N operations) of the contended value of the performance metric. Thus, the method 500 of FIG. 5 may be used to fine tune the conditions under which a synchronization object is partitioned, thereby further improving database performance.

Figure 6:
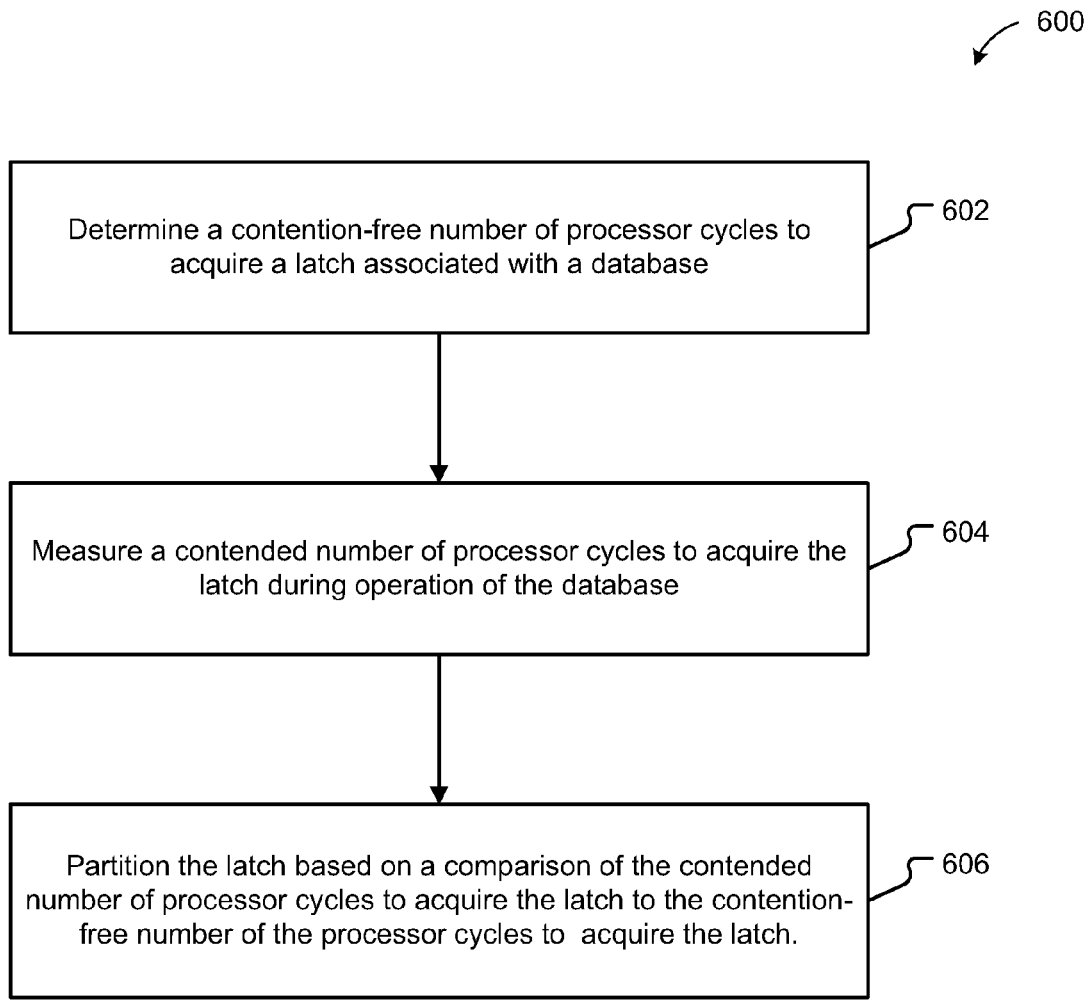
FIG. 6 is a flow diagram to illustrate a particular embodiment of a method of partitioning a contended database latch.

FIG. 6 is a flow diagram to illustrate a particular embodiment of a method 600 of partitioning a contended database latch. In an illustrative embodiment, the method 600 may be performed by the system 200 of FIG. 2.

The method 600 includes determining a contention-free number of processor cycles to acquire a latch associated with a database, at 602. For example, referring to FIG. 2, the latch monitor 240 may measure a contention-free number of processor cycles to acquire the latch 220.

The method 600 also includes measuring a contended number of processor cycles to acquire the latch during operation of the database, at 604. For example, referring to FIG. 2, the latch monitor 240 may measure a contended number of processor cycles to acquire the latch 220.

The method 600 further includes partitioning the latch based on a comparison of the contended number of processor cycles to acquire the latch to the contention free number of the processor cycles to acquire the latch, at 606. For example, referring to FIG. 2, the partition manager 250 may partition the latch 220 based on a comparison of the contended number of the processor cycles to acquire the latch 220 to the contention-free number of processor cycles to acquire the latch 220.

It will be appreciated that the method 600 of FIG. 6 may be used to reduce contention associated with a database latch by partitioning the database latch based on a measured number of CPU cycles as compared to a contention-free number of CPU cycles to acquire the database latch. It will thus be appreciated that the method 600 of FIG. 6 may reduce latch contention in database systems that include many (e.g., more than 64) processors, because the partitioning is based on a relative CPU cycle evaluation and not based on a static partition threshold (e.g., completed latch acquisitions per minute).

Figure 7:
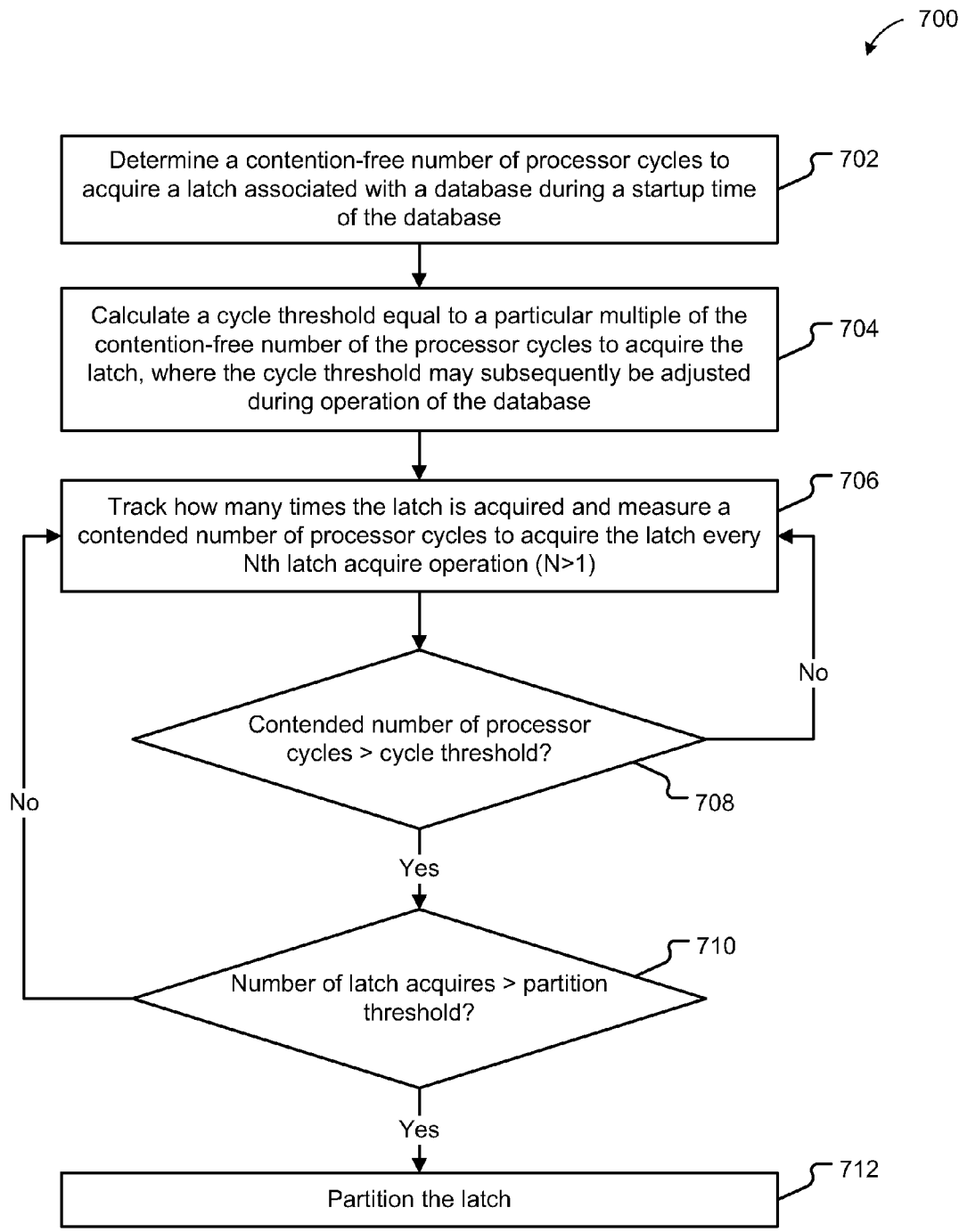
FIG. 7 is a flow diagram to illustrate another particular embodiment of a method of partitioning a contended database latch.

FIG. 7 is a flow diagram to illustrate another particular embodiment of a method 700 of partitioning a contended database latch. In an illustrative embodiment, the method 700 may be performed by the system 200 of FIG. 2.

The method 700 includes determining a contention-free number of cycles to acquire a latch associated with a database during a startup time of the database, at 702. For example, referring to FIG. 2, the latch monitor 240 may measure a contention-free number of processor cycles to acquire the latch 220.

The method 700 also includes calculating a cycle threshold equal to a particular multiple of the contention-free number of the processor cycles to acquire the latch, at 704. The cycle threshold may subsequently be adjusted during operation of the database. For example, referring to FIG. 2, the latch monitor 240 may calculate a cycle threshold equal to a particular multiple of the contention-free number of processor cycles to acquire the latch 220.

The method 700 further includes tracking how many times the latch is acquired and measuring a contended number of processor cycles to acquire the latch every Nth latch acquire operation, at 706, where N is greater than 1. For example, with reference to FIG. 2, the latch monitor 240 may track the number of times the latch 220 is acquired. The latch monitor 240 may measure a contended number of processor cycles to acquire the latch 220 periodically (e.g., every Nth time the latch 220 is acquired).

The method 700 includes determining whether the contended number of processor cycles is greater than the cycle threshold, at 708. For example, referring to FIG. 2, the performance metric comparison logic 242 may determine whether the contended number of processor cycles is greater than the cycle threshold. When the contended number of processor cycles is less than the cycle threshold, the method 700 returns to 706.

Occasionally, a latch may be partitioned even though the partitioning of the latch does not result in a large performance improvement. For example, the particular contended value that resulted in the latch being partitioned may have been a statistical outlier. As another example, the particular latch that was partitioned may not be used often enough to make partitioning the particular latch worth the decrease in available system memory. That is, even though attempting to acquire the latch may occasionally result in long waiting periods, the frequency of such long waiting periods may be low because the latch is not used very often. Consequently, the multiple used in the partition decisions may be adjusted by a user based on a particular system decision. Alternatively, a partition threshold may be used to avoid partitioning of seldom used latches.

When the contended number of processor cycles is greater than the cycle threshold, the method 700 includes determining whether the number of latch acquires is greater than a partition threshold, at 710. For example, referring to FIG. 2, the latch monitor 240 may determine whether the latch 220 has been acquired more than a partition threshold (e.g., one hundred) number of times. When the number of latch acquires is less than the partition threshold, the method 700 returns to 706.

When the number of latch acquires is greater than the partition threshold, the method 700 includes partitioning the latch, at 712. For example, referring to FIG. 2, when the latch 220 has been acquired more than the partition threshold number of times, the partition manager 250 may partition the latch 220.

It will be appreciated that the method 700 of FIG. 7 may prevent latches that have not been acquired a minimum number of times (i.e., greater than a partition threshold) from being partitioned. It will thus be appreciated that the method 700 of FIG. 7 may improve database performance by preventing a particular latch from being partitioned when the particular latch is not used often enough to make partitioning the particular latch worth the extra cost of partitioning. Thus, the method 700 of FIG. 7 may maintain a latch as a shared latch when the number of times the latch has been acquired is less than the partition threshold. In a particular embodiment, the method 700 of FIG. 7 may also include limiting a maximum number of CPU cycles a particular acquire operation associated with a synchronization object (e.g., a latch) may take, thereby reducing statistical outliers. For example, limiting a maximum number of CPU cycles for particular acquire operation may avoid statistical outliers due to an error or race condition caused by a previous acquire operation.

Figure 8:
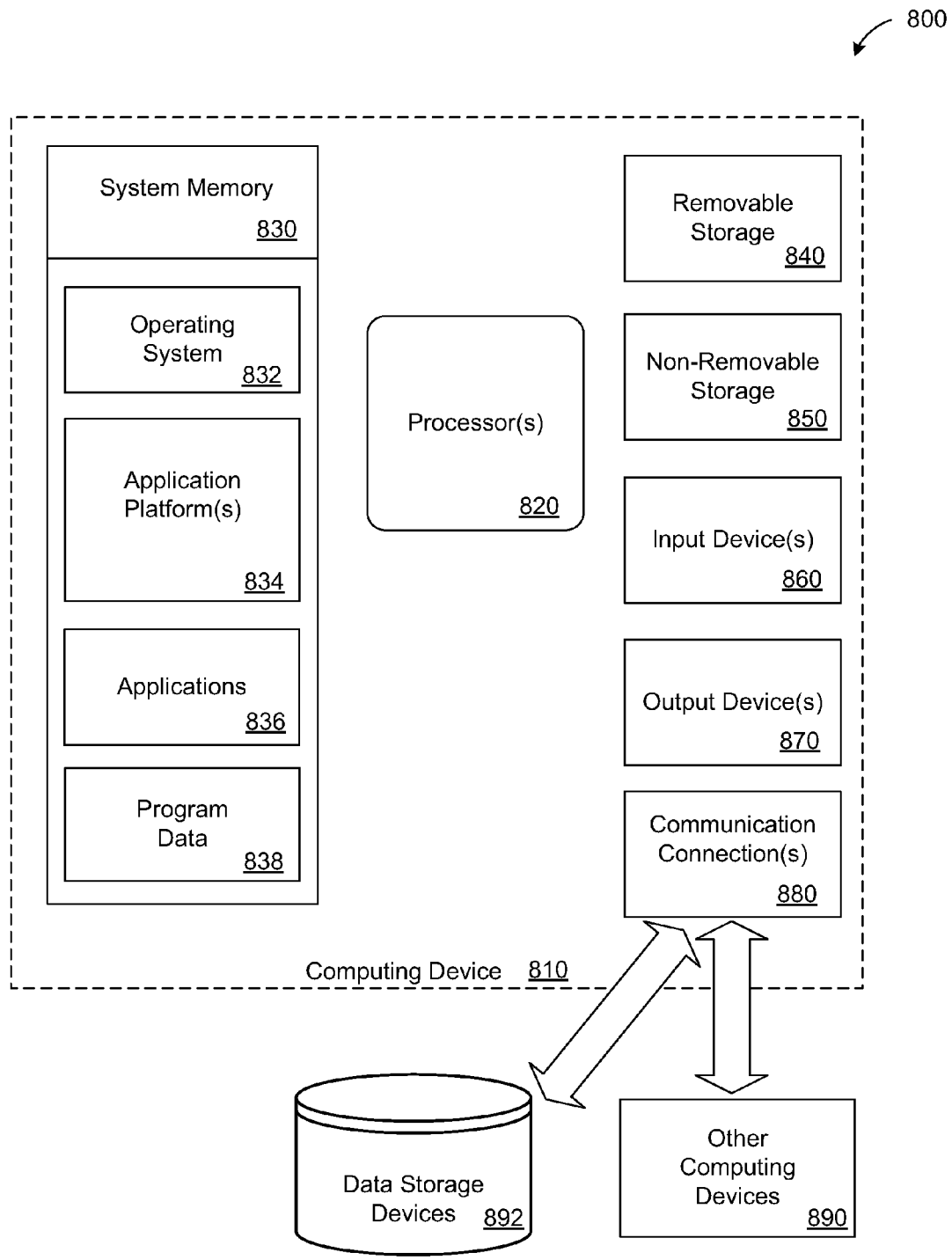
FIG. 8 is a block diagram of a computing environment including a computing device operable to support embodiments of computer-implemented methods, computer program products, and system components as illustrated in FIGS. 1-7.

FIG. 8 is a block diagram of a computing environment including a computing device operable to support embodiments of computer-implemented methods, computer program products, and system components according to the present disclosure. In an illustrative embodiment, the computing device 810 may include the first computing device 304 of FIG. 3 or the second computing device 306 of FIG. 3.

The computing device 810 typically includes one or more processors 820 and system memory 830. Depending on the configuration and type of computing device, the system memory 830 may be volatile (such as random access memory or "RAM"), non-volatile (such as read-only memory or "ROM," flash memory, and similar memory devices that maintain stored data even when power is not provided) or some combination of the two. The system memory 830 typically includes an operating system 832, one or more application platforms 834, one or more applications 836, and may include program data 838. In an illustrative embodiment, the one or more processors 820 include the CPUs 132, 134, and 136 of FIG. 1, the processing units 230 of FIG. 2, or the processors 331-336 of FIG. 3. In another illustrative embodiment, the system memory 830 may include the paged buffer pool 204 of FIG. 2, the latch monitor 240 of FIG. 2, the partition manager 250 of FIG. 2, or any combination thereof.

The computing device 810 may also have additional features or functionality. For example, the computing device 810 may also include removable and/or non-removable additional data storage devices such as magnetic disks, optical disks, tape, and standard-sized or miniature flash memory cards. Such additional storage is illustrated in FIG. 8 by removable storage 840 and non-removable storage 850. Computer storage media may include volatile and/or non-volatile storage and removable and/or non-removable media implemented in any method or technology for storage of information such as computer-readable instructions, data structures, program components or other data. The system memory 830, the removable storage 840 and the non-removable storage 850 are all examples of computer storage media. The computer storage media includes, but is not limited to, random access memory (RAM), read-only memory (ROM), electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 810. Any such computer storage media may be part of the computing device 810. The computing device 810 may also include input device(s) 860, such as a keyboard, mouse, pen, voice input device, touch input device, etc. Output device(s) 870, such as a display, speakers, printer, etc. may also be included.

The computing device 810 also contains one or more communication connections 880 that allow the computing device 810 to communicate with other computing devices 890 over a wired or a wireless network. The computing device 810 may also communicate with one or more data storage devices 892 via the one or more communication connections 880. The one or more data storage devices 892 may include random access memory (RAM), flash memory, read-only memory (ROM), registers, a hard-disk, a removable disk, a CD-ROM, or any other form of storage medium known in the art. In an illustrative embodiment, the external data storage devices 892 include the data storage devices 202 of FIG. 2. The one or more communication connections 880 are an example of communication media. By way of example, and not limitation, communication media may include wired media such as a wired network or direct-wired connection, and wireless media, such as acoustic, radio frequency (RF), infrared and other wireless media. It will be appreciated, however, that not all of the components or devices illustrated in FIG. 8 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process or instruction steps described in connection with the embodiments disclosed herein may be implemented as electronic hardware, computer software, or combinations of both. To clearly illustrate this interchangeability of hardware and software, various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable any person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    determining a contention-free value of a performance metric associated with a synchronization object of a data structure;
    measuring a contended value of the performance metric; and
    partitioning the synchronization object when the contended value of the performance metric exceeds a multiple of the contention-free value of the performance metric,
    wherein the contended value of the performance metric is measured during operation of a database and the data structure is a database page of the database, wherein the synchronization object is a latch associated with the database page, and wherein the latch is acquired prior to reading from or writing to the database page.

2. The method of claim 1, wherein the performance metric includes a number of central processing unit (CPU) cycles to acquire the synchronization object from the database or memory latency associated with accessing the synchronization object from the database.

3. The method of claim 1, wherein the contention-free value of the performance metric is measured during an initialization time of the database.

4. The method of claim 1, further comprising tracking a number of times the synchronization object has been acquired and partitioning the synchronization object when the number of times satisfies a threshold.

5. The method of claim 1, further comprising adjusting the multiple of the contention-free value.

6. The method of claim 1, wherein the data structure is accessible by a plurality of computing devices, the method further comprising determining a contention-free value of the performance metric for each of the plurality of computing devices, measuring a contended value of the performance metric at each of the plurality of computing devices, and partitioning the synchronization object at a particular computing device when the contended value of the performance metric at the particular computing device exceeds a particular multiple of the contention-free value of the performance metric at the particular computing device.

7. A computer-readable storage medium comprising instructions, that when executed by a computer, cause the computer to:
determine a contention-free number of processor cycles to acquire a latch associated with a database;
measure a contended number of processor cycles to acquire the latch during operation of the database;
partition the latch based on a comparison of the contended number of processor cycles to acquire the latch to the Contention-free number of processor cycles to acquire the latchet; and
cause the computer to track a number of times the latch has been acquired and to maintain the latch as a shared latch when the number of times the latch has been acquired is less than a partition threshold.

8. The computer-readable storage medium of claim 7, wherein the latch is partitioned when the contended number of processor cycles exceeds a particular multiple of the contention-free number of processor cycles, wherein the particular multiple is greater than one.

9. The computer-readable storage medium of claim 8, wherein the particular multiple is adjusted during operation of the database.

10. A method comprising:
determining a contention-free value of a performance metric associated with a synchronization object of a data structure;
measuring a contended value of the performance metric; and
partitioning the synchronization object when the contended value of the performance metric exceeds a multiple of the contention-free value of the performance metric, wherein the contended value of the performance metric is measured periodically or measured every N instances of an operation associated with the synchronization object, where N is an integer greater than 1.

11. The method of claim 10, wherein the data structure is a data cache and the contended value of the performance metric is measured while the data cache is in use.

12. The method of claim 10, wherein the operation associated with the synchronization object is an acquire operation.

13. The method of claim 12, further comprising limiting a maximum number of CPU cycles for the acquire operation associated with the synchronization object.

* * * * *